UNITED STATES PATENT OFFICE.

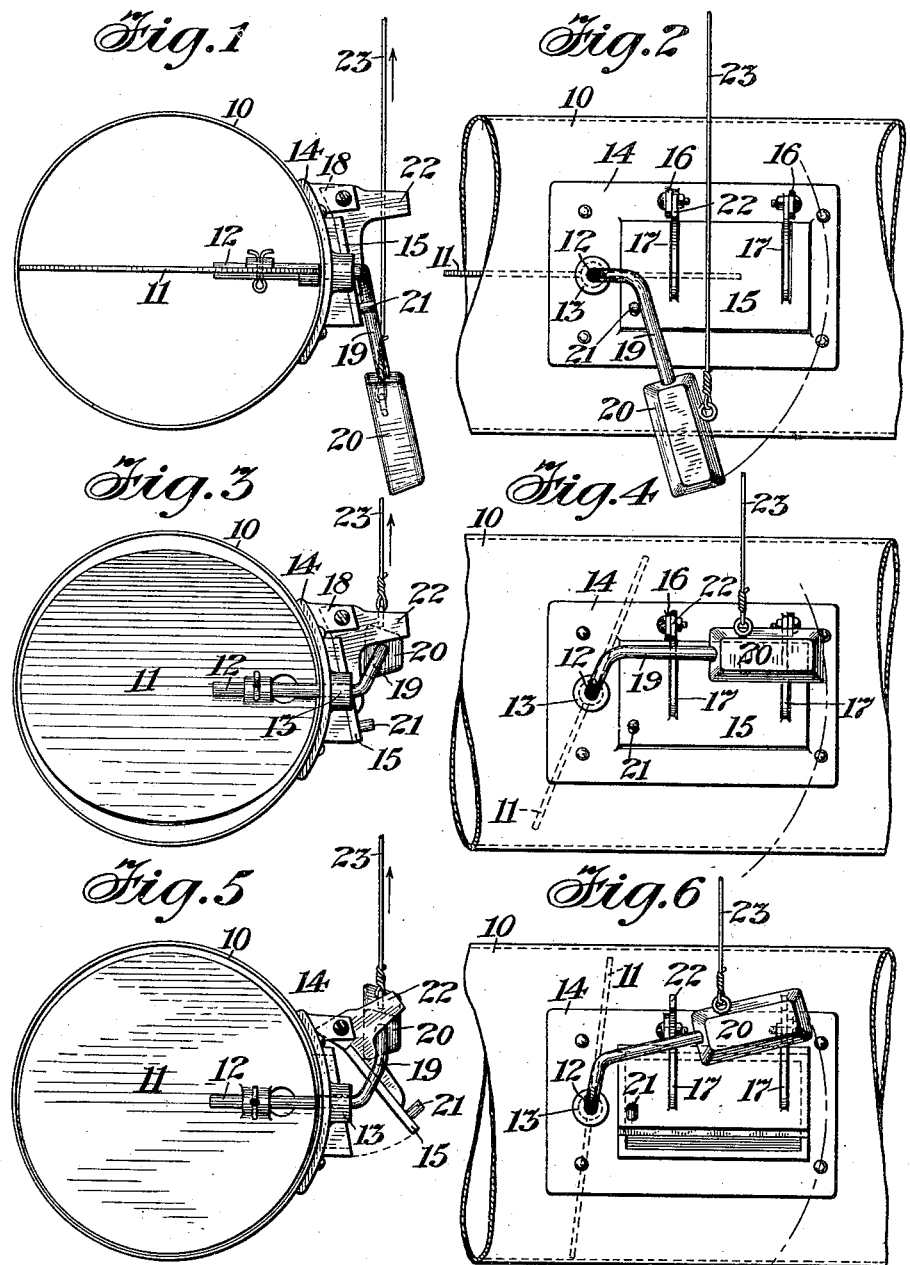

CYRUS S. HOOD, OF CORNING, NEW YORK.

COMBINED DAMPER AND AIR-CHECK.

1,125,536.  Specification of Letters Patent. Patented Jan. 19, 1915.

Application filed February 15, 1913. Serial No. 748,522.

*To all whom it may concern:*

Be it known that I, CYRUS S. HOOD, a citizen of the United States, and resident of Corning, in the county of Steuben and State of New York, have invented certain new and useful Improvements in Combined Dampers and Air-Checks, of which the following is a specification.

My invention in its preferred embodiment is designed for use in connection with chimneys, smoke pipes or other conduits used for the conveying of gases from a stove, furnace, or other source of gas or other fluid supply.

My invention in certain of the forms which it may assume is useful in connection with conduits used for other purposes, but to facilitate a clear understanding of the invention, I will describe one form which is particularly useful as a combined damper and air check for chimneys or other smoke conduits.

In this specific embodiment of my invention, the main object is to permit the opening and closing of the damper from a point remote from the conduit for instance a living room on the floor above, and to facilitate the opening and closing of an air check in the conduit, so that the fire may be effectively controlled. In my improved construction hereinafter described in detail, the air check is on the delivery side from the damper and cannot be opened except when the damper is substantially closed; thus the furnace gas can not flow out of the air check opening. The check is so formed as to be automatically opened after the substantial closing of the damper and thus the draft may be reduced and the fire more completely checked. The damper may be partly closed to regulate the fire without opening the check and all movements of the damper and check may be accomplished by operating a single cord, chain or rod leading to any convenient point.

Reference is to be had to the accompanying drawing, in which similar reference characters indicate corresponding parts throughout the several views.

Figure 1 is an end view of a conduit provided with a combined damper and air check embodying my invention; Fig. 2 is a side elevation of the construction shown in Fig. 1; Fig. 3 is a view similar to Fig. 1, but showing the damper partly closed; Fig. 4 is a side elevation of the parts in the position indicated in Fig. 3; Fig. 5 is a view similar to Fig. 1, but showing the air check in open position; and Fig. 6 is a side elevation of the parts in the position indicated in Fig. 5.

I have illustrated my invention as applied to a conduit 10 circular in cross-section and formed of sheet metal, but it is evident that the invention may be applied to a conduit of any other suitable cross section or might be employed in connection with a vertical chimney of brick, concrete or other material. Within the conduit I have illustrated a closure in the form of a damper 11 of the common circular plate type mounted to rotate about an axis disposed diametrically of the conduit so that the damper may be turned to lie in the plane of a diameter as indicated in Fig. 1, or may be turned to lie in a plane substantially at right angles to the axis of the conduit as indicated in Fig. 5.

In the specific embodiment I mount the damper on a rod or shaft 12 disposed substantially horizontal and projecting through a bearing 13 forming a part of a cast metal plate 14 riveted or otherwise rigidly secured to the side of the conduit and covering an opening in the latter. The plate 14 has an opening therethrough constituting the air check opening and this is normally covered by a closure in the form of a door 15 hinged to its upper edge and seating by gravity. The closure may be hinged in any suitable manner, but preferably the plate 14 has lugs 16 extending out from adjacent the upper edge and the closure has reinforcing flanges 17 upon one surface, preferably the outer surface, and extending above the upper edge of the closure, and bolted to the lugs 16, the bolts serving as pintles of the hinge. One or both of the flanges 17 at its upper end may have a projecting corner 18 as shown in dotted lines in Figs. 1, 3 and 5, and which may serve as a stop to engage with the outer surface of the plate 14 and limit the opening movement of the closure, as is indicated in Fig. 5.

The opening in the conduit and its closure 15 is located adjacent to the damper but upon the side thereof opposite to the stove or furnace, in other words, between the damper and the delivery end of the conduit. With the device used in a conduit employed for some other purpose the opening and its closure might be upon the receiving rather than the delivery side of the damper. The two are preferably so mounted in respect to each other that the damper may turn through a limited distance independently of any movement of the closure 15, but the closure 15 will be automatically moved upon the movement of the damper passing a predetermined position.

Various different mechanisms might be employed for securing this result but a very simple and efficient arrangement involves the bending of the rod 12, so as to form a lever or arm 19 adjacent to the outer surface of the door 15 and movable past said surface. The arm is preferably provided with a weight 20 tending to normally hold the damper in a predetermined position, as for instance in open position, and the door 15 has a stop 21 for limiting the swing of the lever in one direction and a stop 22 for limiting the swing in the opposite direction. The stop 21 is preferably located adjacent the free edge of the door so that when the arm 19 is in engagement therewith, the damper will be in open position as indicated in Figs. 1 and 2. The arm 19 lying adjacent to the outer surface of the closure 15 positively locks the latter in closed position when the damper is fully opened. The flange 17 which is nearest to the bearing 13 has its outer edge so positioned as to prevent the opening of the closure 15 until the arm 19 approaches the hinged edge of the closure as indicated in Figs. 5 and 6. At this time the damper 11 will be partly, but preferably not entirely, closed. With the parts in this position the fire will be under control but the draft will not be entirely shut off.

The stop 22 is located adjacent to the hinged edge of the closure so that the arm 19 will come in contact therewith when it reaches substantially the position indicated in Figs. 3 and 4. A further upward movement of the arm 19 will cause a corresponding upward movement of the stop 22 and this will result in the desired opening of the closure 15. The closure 15 can be opened to only a limited extent, determined by the position of the stop 18 and thus when the stop 18 comes into operation the stop 22 is prevented from moving further and a further movement of the damper 11 is also prevented. At this time the damper will preferably be in substantially a completely closed position.

Any suitable means may be employed for swinging the lever 19 but preferably I rely upon the weight 20 to move it in one direction and attach a suitable device, such for instance as a wire 23, or an equivalent cord, chain or rod to move it in the other direction. This may extend upwardly from the lever to the living room above or may extend over pulleys to any convenient point from which it is desired to operate the combined damper and air check. Both the damper and the air check are gravity operated in one direction so that by pulling on the wire 23, the parts may be moved to one position and by releasing the wire they will automatically return. Upon the opening of the damper 11 the air check will close while the damper is still partly closed, so that at no time will the air check and the damper both be opened at the same time. The lost motion connections between the damper and the air check permits the proper operating of the damper entirely independent of any movement of the check but permits the check to come into operation when the necessity for it arises, namely, when the damper has been nearly, if not entirely, closed. In case the air check should tend to remain in open position by any wedging of the parts, it is noted that the return lowering movement of the lever 19 exerts a cam action from the outer surface of the closure 15 and tends to force the latter to its closed position and there lock it until the damper is again closed to the predetermined position.

Having thus described my invention, what I claim as new and desire to protect by Letters-Patent is:—

1. A conduit having an air inlet opening, a damper within said conduit and adjacent to said opening, a swinging door for closing said air inlet and normally held closed by gravity, an arm connected to said damper, and a stop adjacent to the pivotal support of said door and in the path of movement of said arm, said arm being spaced from said stop when said damper is open, whereby said door is opened upon the movement of said arm and the closing of said damper past a predetermined position.

2. A conduit having an air inlet opening, a damper within said conduit and adjacent to said opening, a swinging door for closing said air inlet and normally held closed by gravity, an arm for operating said damper, and a stop adjacent to the free edge of said damper and normally serving as a support for said arm, said arm being movable along the outer surface of said door to insure the closing of the latter during a movement of said damper in one direction.

3. A conduit having a damper, a door adjacent to said damper, a weighted arm outside of said conduit for operating the damper and normally tending to hold said damper in open position, and a stop on the outer side of said door in the path of movement of said arm and serving to open said door after a predetermined closing movement of said damper and arm.

4. A conduit having a damper provided with a weighted arm for operating the latter and normally tending to hold said damper in open position, a door adjacent to said damper, and a stop on said door adjacent to the hinged edge of the latter and in the path of movement of said arm and serving to open said door after a predetermined closing movement of said damper and arm.

5. A conduit having a damper provided with a weighted arm for operating the latter and normally tending to hold said damper in open position, a door adjacent to said damper and stops on the outer surface of said door for limiting the swing of said arm, one of said stops serving to open said door upon a predetermined movement of said arm.

6. A conduit having a door in the side thereof normally held closed by gravity, a damper within said conduit adjacent to said door and normally held in open position by the action of gravity and an operating arm connected to said damper and movable past said closure for opening the latter after the damper has been moved to a substantially closed position.

7. A conduit having a damper therein, a door in the side thereof, and means normally tending to hold said damper in open position, said means including an arm movable past the outer surface of said door, stops on said door for limiting the swinging movement of said arm, one of said stops serving as a lever to open said door upon the further movement of said arm after the latter engages with said stop.

8. A conduit having a damper therein, a hinged closure in the side of said conduit, an arm connected to said damper and disposed adjacent the outer surface of said closure and normally locking the latter in closed position, and means adjacent the hinged edge of said closure for opening said closure upon the engagement of said arm with said means.

9. A conduit having a damper therein rotatable about a substantially diametrically disposed axis, a door hinged in the side wall of said conduit, the hinge of said door being adjacent the upper edge of the latter, whereby said door is normally held closed by gravity, a lever rigid with said door and extending outwardly therefrom adjacent the hinged edge, a stop on said door adjacent the lower edge, and a lever connected to said damper and movable about the axis of the latter as a center and in a plane approximately parallel to the plane of said door opening and past the outer surface of said door between said lever and said stop, said stop serving to limit the turning of said damper in one direction to an open position and said damper lever engaging with said door lever to open said door upon the swinging of said damper lever in the opposite direction after the substantial closing of said damper.

Signed at Corning, in the county of Steuben and State of New York this 10th day of February, A. D. 1913.

CYRUS S. HOOD.

Witnesses:
ALFRED MALTBY,
ALFRED G. HOOD.

Copies of this patent may be obtained for five cents each, by addressing the "Commissioner of Patents, Washington, D. C."